United States Patent [19]

Sundar et al.

[11] 4,314,779

[45] Feb. 9, 1982

[54] METHOD OF AQUIFER RESTORATION

[75] Inventors: Parameschwaran S. Sundar, Pittsburgh, Pa.; Erich W. Tiepel, Littleton, Colo.

[73] Assignee: Wyoming Mineral Corp., Lakewood, Colo.

[21] Appl. No.: 203,308

[22] Filed: Nov. 3, 1980

Related U.S. Application Data

[63] Continuation of Ser. No. 25,513, Mar. 30, 1979, abandoned.

[51] Int. Cl.$^3$ .................... E21B 43/27; E21B 43/28
[52] U.S. Cl. .................... 405/263; 166/266; 166/271; 299/4
[58] Field of Search .................... 299/3-5, 299/7; 166/266, 267, 271, 307; 405/263

[56] References Cited

U.S. PATENT DOCUMENTS

| | | | |
|---|---|---|---|
| 2,818,240 | 12/1957 | Livingston | 299/4 |
| 3,278,232 | 10/1966 | Fitch et al. | 299/4 |
| 4,079,783 | 3/1978 | Snavely et al. | 299/4 X |
| 4,114,693 | 9/1978 | Foster et al. | 299/4 X |
| 4,134,618 | 1/1979 | Kossack | 299/5 |
| 4,155,982 | 5/1979 | Hunkin et al. | 299/4 X |

*Primary Examiner*—Stephen J. Novosad
*Attorney, Agent, or Firm*—R. D. Fuerle

[57] ABSTRACT

A method is disclosed for restoring a clay rich aquifer which has been solution mined with ammonium ions. Calcium carbonate is precipitated from a solution pumped through the aquifer by the addition of calcium oxide, calcium hydroxide, or a mixture thereof in quantities sufficient to raise the pH to at least about 9.5. The precipitated calcium carbonate is separated from the solution and the ammonium ion is then removed from the solution by standard techniques. The solution is recycled through the aquifer and these steps are repeated until the bicarbonate ion concentration has been reduced to such an extent that the addition of at least one soluble salt of calcium, magnesium, or potassium to the solution does not result in precipitation of calcite underground, plugging the aquifer. Recycling with the addition of the soluble salt is continued until the ammonium ion concentration is reduced to a desired level. Finally, residual amounts of the salt are removed from the aquifer using standard techniques.

14 Claims, 1 Drawing Figure

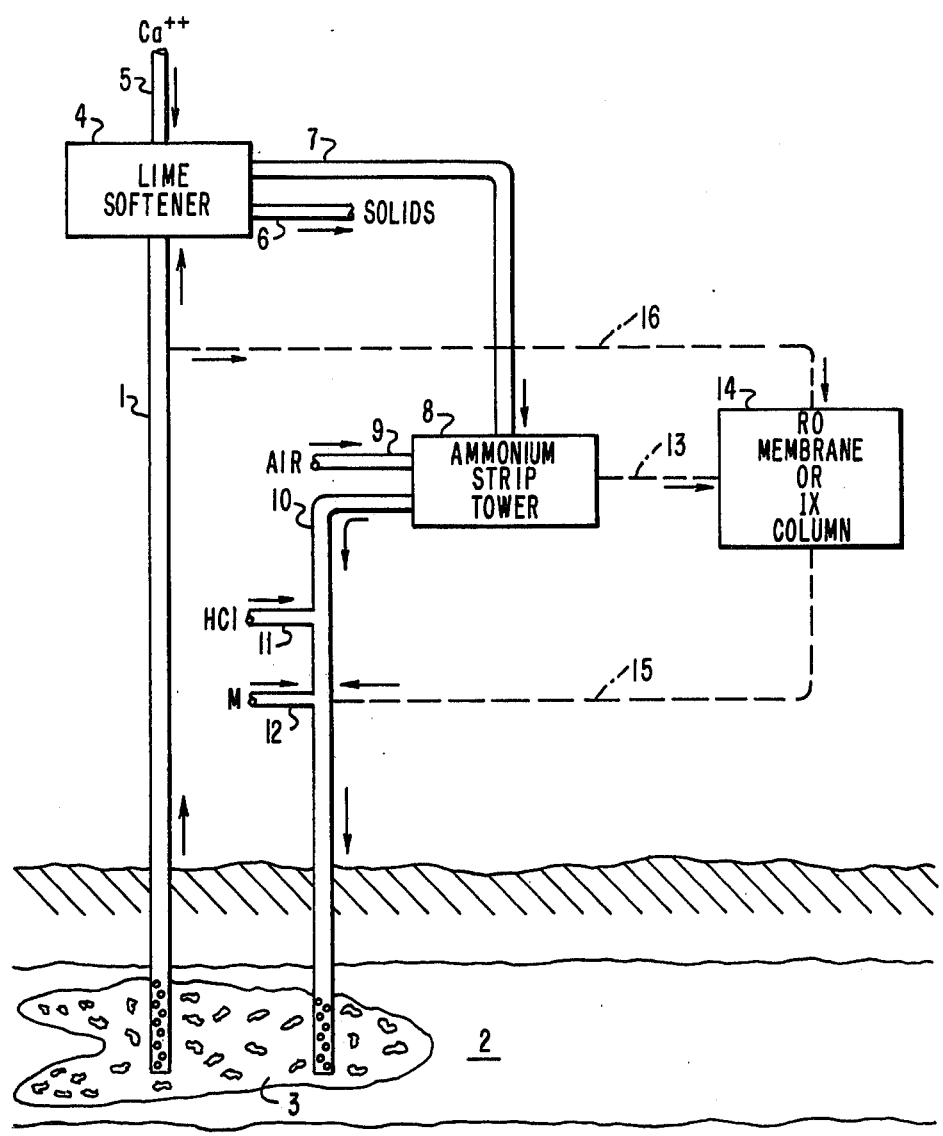

METHOD OF AQUIFER RESTORATION

This is a continuation of application Ser. No. 025,513, filed Mar. 30, 1979 now abandoned.

BACKGROUND OF THE INVENTION

Methods of solution mining uranium have been perfected to the extent that the processes are now commercial. In-situ leaching of uranium mineralized in unconsolidated sandstone layers underground is typically carried out using an alkaline bicarbonate such as an ammonium bicarbonate-ammonium carbonate solution along with an oxidant such as a peroxide. The sandstone stata amendable to in-situ leaching is generally contained between confining shale or mudstone layers. The mineralization also generally contain some amount of clay usually in the range 5 to 15%, consisting predominantly of montmorillonite or kaolinite with small amounts of illite and clinoptilolite clays.

The uranium that is leached from the in-situ ore body and is in the pregnant leach solution is recovered by hydrometallurgical methods, such as ion exchange. The leach solution is recycled after restoring its chemical strengths in the reagent and the oxidant. During the in-situ leaching process due to the underground mineralization, the ammonium ion in the leach solution may be absorbed by the clay fraction. The counter ion released from the clay may be calcium, magnesium, sodium, potassium, etc., depending upon the state of the virgin clay. One of the principal problems in the utilization of this technology is the restoration of the leached mineralization to a stable aquifer as mandated by state and federal legislation. Until now, techniques for accomplishing the restoration of the aquifer were limited to pumping old water out of the aquifer and discarding it and permitting ground water to seep into the mine zone from the surrounding aquifer, a technique known as ground water sweep. Another technique that was also used was called "clean water recycle" which involved cleansing the solution pumped from the aquifer through a reverse osmosis membrane and pumping the cleansed water back underground until the ammonium ions were removed from the aquifer. Both these techniques could require long periods of time to reduce the ammonium ion level to acceptable levels depending on the characteristics of the clay.

SUMMARY OF THE INVENTION

We have discovered a method of restoring an aquifer which has been mined for uranium or other metals using an ammonium ion containing solution mining techniques. Basically, our invention involves the removal of bicarbonate ion followed by the removal of the ammonium ion and the removal of residual salts used in the process.

Our technique reduces ammonium ion concentration much more rapidly than previous techniques and is capable of reducing the concentration to levels which meet the restoration criteria of various government agencies. Our process does not use expensive materials and is not unduly elaborate.

DESCRIPTION OF THE INVENTION

The accompanying drawing is a block diagram which illustrates a certain presently-preferred embodiment of the process of this invention.

This invention is useful in restoring clay-containing aquifers because it is in clay-containing aquifers that ammonium ion retention is a problem. An aquifer having about 5 to about 25% clay or more can be usefully restored using the process of this invention and aquifers having as low as about 2% clay can probably also benefit from the technology embodied in this invention. The invention is applicable to aquifers which were mined using lixiviants containing ammonium ions. Usually, the solutions are used to mine uranium although they could also be used to mine other metals.

Referring to the drawing, a solution in line 1 is pumped out of the underground aquifer 2 from leached ore 3 to lime softener 4. In the lime softener, the bicarbonate ion is removed to prevent it from forming precipitating calcite underground which could plug the formation. The removal of the bicarbonate ion is accomplished by the precipitation of calcite, calcium carbonate, $CaCO_3$. The calcium carbonate precipitation is accomplished by the addition of lime, $Ca(OH)_2$, or calcium oxide, $CaO$ or mixtures thereof (line 5 in drawing). It is preferably to use calcium oxide as it is less expensive than lime. The amount of calcium oxide or hydroxide added should be at least stoichiometrically equivalent to the bicarbonate ion concentration in the solution and should be sufficient to raise the pH to at least 9.5. Preferably, sufficient calcium oxide or hydroxide is added to raise the pH to about 10 to about 12. Higher pH's may be used but require the addition of too much calcium oxide or hydroxide.

The precipitated calcium carbonate solids are then separated from the remainder of the solution (line 6 in drawing). This can be accomplished by any standard technique such as the use of a decantation or settling device or a filter. Uranium which is in solution also tends to precipitate with the calcium carbonate and if its concentration is high enough, recovery of it may be economical.

From lime softener 4, the remaining solution passes through line 7 to an ammonium removal system 8 where the ammonium ion is removed from the solution. This may be accomplished in several ways. The preferred technique is ammonia air stripping, a well-known procedure. In this technique, air from line 9 is bubbled through the solution which carries off ammonia gas according to the equation

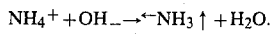

$$NH_4^+ + OH^- \rightarrow \leftarrow NH_3 \uparrow + H_2O.$$

The ammonia gas can be recovered as dilute ammonium hydroxide by bubbling it through water or as an ammonium salt such as $(NH_4)_2SO_4$, $NH_4Cl$, or $NH_4NO_3$ by bubbling it through a solution of $H_2SO_4$, $HCl$, or $HNO_3$, respectively. Alternatively, instead of using ammonia air stripping (which is illustrated in the drawing), the ammonium ion may be removed using clinoptillolite clay absorption in a packed bed tower or in a slurry in a mix tank, which are also well-known techniques. The ammonium ion is absorbed onto the clay, and is later removed from the clay by dilution with a high pH solution such as sodium hydroxide or calcium hydroxide. This technique is less preferred than air stripping because the pH of the solution must be lowered to about 5 to 9 with an acid such as sulfuric acid before it can be used, and it therefore requires more steps and is more expensive.

An additional alternative for ammonia ion removal is the use of standard biological denitrification methods.

In this technique, standard biological treatment systems are used to convert the $NH_4^+$ to nitrogen gas, $N_2$, and thus, effect the ammonium ion removal.

The remaining solution is then recycled through line 10 back underground to the aquifer. The solution is recycled and the above steps are repeated until the bicarbonate ion concentration in the solution is low enough to permit proceeding to the next step without plugging the formation by precipitating calcium carbonate underground. If the formation is not very permeable, it is also necessary during this recycling to add an acid such as hydrochloric acid from line 11 to reduce the pH to about the range of 6 to 10 to prevent the underground precipitation of calcite. Also, if the aquifer begins to plug up at any time due to the precipitated calcite, the addition of hydrochloric acid can be used to open it up again. If the particular formation is a very loose formation, one can proceed to the next step sooner and risk some underground calcite precipitation.

Once the bicarbonate ion concentration has been reduced, high concentrations of calcium, magnesium, potassium, or mixtures thereof are introduced in line 12 to displace the remaining ammonium ions from the clay. The introduction of these ions can be accomplished by adding any soluble salt of calcium, magnesium, potassium, or mixtures thereof. Calcium, however, is preferred because of its high affinity for clay. The preferred anion is hydroxide for calcium, sulfate for magnesium and chloride for potassium. If calcium hydroxide is used, the concentration used is about 100 ppm to about saturation. If another soluble salt is used, the concentration is about 100 ppm up to about 10 grams per liter. The solution is again recycled through lines 1, 7 and 10 as before except that no hydrochloric acid is added from line 11. This recycling step is continued until the ammonium ion concentration has decreased to an acceptable level, usually considered to be about 50 to about 100 ppm.

Finally, it is necessary to remove the residual soluble salts of calcium, magnesium, or potassium and other residual salts which may be present due to the solution mining process which were previously added. This can be accomplished using standard ground water sweeping or clean water recycle techniques. Clean water is pumped through the aquifer until the total dissolved solids in the solution have been reduced to acceptable levels. Alternatively, a clean water recycle technique can be used. In this technique, the solution is recycled as before except that after the ammonium strip tower 8, the solution passes through line 13 to a reverse osmosis membrane or ion exchange column 14 and back underground through line 15 until the total dissolved solids have been reduced.

It is also possible at this state to process solution 1 directly in the RO unit, 14, without going through the lime softener, 4, or ammonia strip tower, 8, as shown by line 16.

The following example further illustrates this invention.

EXAMPLE

Agitation leach tests were performed on the following samples of ammoniated clay.

| Clay Type | Ammonium Content meq/g |
|---|---|
| Montmorillonite No. 24, California | 1.0 |
| Montmorillonite No. 27, South Dakota | 0.818 |
| Kaolinite No. 9, North Mexico | 0.02 |
| Illite Bearing Shale, Illinois | 0.159 |
| Clinoptilolite, California | 1.735 |

Five grams of the clay were agitated in 200 milliliters of water containing various concentrations of calcium hydroxide. After 24 hours, the solutions were analyzed to determine the amount of ammonia removed from the clay. The following table gives the result.

| CALCIUM HYDROXIDE TESTS | | | | | |
|---|---|---|---|---|---|
| Volume of Solution Used = 200 ml | | | | | |
| Amount of Clay Used = 5.0 g | | | | | |
| No. | Clay Type | Ca Conc. mg/ Feed | Ca Conc. mg/ Raff. | Ca$^+$ Exchd. meq/g | % NH$_3$ Reject. (estimate) | Final Ph |
| 1 | Mont., Calif. | 895 | 168 | 1.454 | 100 | 11.4 |
| 2 | Mont., Calif. | 452 | 12 | 0.880 | 88.0 | 10.4 |
| 3 | Mont., Calif. | 225 | 12 | 0.426 | 42.6 | 10.5 |
| 4 | Mont., S. Dak. | 895 | 250 | 1.290 | 100 | 11.7 |
| 5 | Mont., S. Dak. | 452 | 135 | 0.634 | 77.5 | 10.3 |
| 6 | Mont., S. Dak. | 225 | 28 | 0.394 | 48.2 | 9.6 |
| 7 | Kaolinite | 895 | 622 | 0.546 | 100 | 11.8 |
| 8 | Kaolinite | 452 | 349 | 0.206 | 100 | 11.8 |
| 9 | Kaolinite | 225 | 155 | 0.140 | 100 | 11.3 |
| 10 | Illite | 895 | 584 | 0.622 | 100 | 11.8 |
| 11 | Illite | 452 | 266 | 0.372 | 100 | 10.9 |
| 12 | Illite | 225 | 137 | 0.176 | 100 | 11.5 |
| 13 | Clinoptilolite | 895 | 95 | 1.600 | 92.2 | 11.1 |
| 14 | Clinoptilolite | 542 | 21 | 0.862 | 49.7 | 10.35 |
| 15 | Clinoptilolite | 225 | 4 | 0.442 | 25.5 | 10.0 |

The above table shows that calcium hydroxide was very effective in removing ammonia from the clay.

We claim:

1. A method of restoring a clay-containing aquifer which has been solution mined with a solution containing ammonium ions comprising:
    (1) precipitating calcium carbonate from a solution pumped through said aquifer by the addition of calcium oxide, calcium hydroxide, or a mixture thereof in quantities sufficient to raise the pH to at least about 9.5;
    (2) separating said precipitated calcium carbonate from said solution;
    (3) removing ammonium ion from said solution;
    (4) recycling said solution through said aquifer and repeating steps (1), (2), and (3) until the bicarbonate ion concentration in said solution has been reduced to an extent such that step (5) can be performed without plugging said aquifer;
    (5) adding at least one soluble salt of calcium, magnesium, potassium, sodium, or mixtures thereof to said solution;
    (6) recycling said solution through said aquifer and repeating steps (1), (2), (3), and (5) until the ammonium ion level is reduced to a desired level; and
    (7) removing residual amounts of said salts introduced in step (5) from said aquifer.

2. A method according to claim 1 wherein said calcium carbonate is precipitated using calcium oxide.

3. A method according to claim 1 wherein the amount of calcium oxide, calcium hydroxide, or mixture thereof added in step (1) is at least stoichiometrically equivalent to the bicarbonate ion concentration in said solution.

4. A method according to claim 1 wherein said pH is raised to about 10 to about 12 in step (1).

5. A method according to claim 1 wherein said ammonium ion is removed by ammonia air stripping.

6. A method according to claim 1 wherein said ammonium ion is removed by clay absorption.

7. A method according to claim 6 wherein said clay used for ammonium absorption to clinoptillolite clay.

8. A method according to claim 1 wherein said ammonium ion is removed by biological denitrification methods.

9. A method according to claim 1 including the additional step during the initial recycling between steps (3) and (4) of adding acid to said solution to reduce the pH of said solution to about 6 to about 10.

10. A method according to claim 8 wherein said acid is hydrochloric acid.

11. A method according to claim 1 wherein said soluble salt is at least one calcium salt.

12. A method according to claim 11 wherein said calcium salt is calcium hydroxide.

13. A method according to claim 1 wherein step (6) is continued until the ammonium ion concentration is reduced to about 50 to about 100 ppm.

14. A method according to claim 1 wherein step (7) is accomplished by standard groundwater sweeping or clean water recycle techniques.

* * * * *